United States Patent
Tokunaga

(10) Patent No.: US 10,605,367 B2
(45) Date of Patent: Mar. 31, 2020

(54) SEALING APPARATUS

(71) Applicant: NOK CORPORATION, Tokyo (JP)

(72) Inventor: Wataru Tokunaga, Ibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/041,003

(22) Filed: Jul. 20, 2018

(65) Prior Publication Data

US 2018/0335145 A1  Nov. 22, 2018

Related U.S. Application Data

(63) Continuation of application No. PCT/JP2017/002194, filed on Jan. 24, 2017.

(30) Foreign Application Priority Data

Feb. 2, 2016 (JP) ................................ 2016-017909

(51) Int. Cl.
*F16J 15/02* (2006.01)
*F16J 15/18* (2006.01)
(Continued)

(52) U.S. Cl.
CPC ........... *F16J 15/18* (2013.01); *F16J 15/3212* (2013.01); *F16J 15/3236* (2013.01)

(58) Field of Classification Search
CPC ....... F16J 15/18; F16J 15/3212; F16J 15/3236
See application file for complete search history.

(56) References Cited

U.S. PATENT DOCUMENTS 3,301,568 A *  1/1967  Perry .................... F16J 15/3456
                                                      277/379
4,585,239 A *  4/1986  Nicholson ............ F16J 15/3212
                                                      277/555
(Continued)

FOREIGN PATENT DOCUMENTS

CN    101317029 A    12/2008
CN    201730616 U     2/2011
(Continued)

OTHER PUBLICATIONS

English Translation of Written Opinion for corresponding International Application No. PCT/JP2017/002194 dated Apr. 25, 2017.
(Continued)

*Primary Examiner* — Gilbert Y Lee

(74) *Attorney, Agent, or Firm* — Pearne & Gordon LLP

(57) ABSTRACT

A sealing apparatus includes an annular lip member made of a resin material, and an annular spring member made of a metal material. The lip member includes a lip base portion, an outer-periphery-side lip, and an inner-periphery-side lip. The spring member includes: a spring base portion having an annular shape about an axis; an outer periphery pressing portion for pressing the outer-periphery-side lip; and an inner periphery pressing portion for pressing the inner-periphery-side lip. The spring member is accommodated in an accommodating groove. The outer periphery pressing portion includes a plurality of outer periphery pressing pieces, and the inner periphery pressing portion includes a plurality of inner periphery pressing pieces. The outer periphery pressing piece has a cutout extending along the axis without reaching a high-pressure-side edge of the outer periphery pressing piece, and the inner periphery pressing piece has a cutout extending along the axis without reaching a high-pressure-side edge of the inner periphery pressing piece.

13 Claims, 6 Drawing Sheets

(51) Int. Cl.
  *F16J 15/3212* (2016.01)
  *F16J 15/3236* (2016.01)

(56) References Cited

U.S. PATENT DOCUMENTS

| | | | |
|---|---|---|---|
| 5,630,591 A * | 5/1997 | Drijver | F16J 15/025 277/553 |
| 2006/0102860 A1 | 5/2006 | Garrison et al. | |
| 2009/0267306 A1 | 10/2009 | Eguchi | |
| 2011/0156361 A1 | 6/2011 | Ghalambor et al. | |
| 2013/0043660 A1 | 2/2013 | Daub et al. | |
| 2014/0360020 A1 | 12/2014 | Ghalambor et al. | |
| 2016/0334017 A1 | 11/2016 | Tadano | |

FOREIGN PATENT DOCUMENTS

| | | |
|---|---|---|
| CN | 102667267 A | 9/2012 |
| CN | 203880093 U | 10/2014 |
| CN | 203880095 U | 10/2014 |
| EP | 3 096 045 A1 | 11/2016 |
| FR | 2247934 A5 * 5/1975 | ........... F16J 15/3212 |
| GB | 430407 A * 6/1935 | ............. F16C 33/74 |
| JP | 2013-515224 A | 5/2013 |
| JP | 2015-135137 A | 7/2015 |
| JP | 2015-194217 A | 11/2015 |

OTHER PUBLICATIONS

International Preliminary Report on Patentability for corresponding International Application No. PCT/JP2017/002194 dated Aug. 7, 2018.
International Search Report for corresponding International Application No. PCT/JP2017/002194 dated Apr. 25, 2017.
Written Opinion for corresponding International Application No. PCT/JP2017/002194 dated Apr. 25, 2017.
Chinese Office Action dated Aug. 1, 2019 for corresponding Chinese Application No. 201780006941.8 and English translation.
German Office Action dated Sep. 17, 2019 for corresponding German Application No. 11 2017 000 623.6 and English translation.
German Office Action dated Jun. 12, 2019 for corresponding German Application No. 112017000623.6 and English translation.

* cited by examiner

# SEALING APPARATUS

CROSS REFERENCE TO RELATED APPLICATIONS

The present application is a continuation application of International Application No. PCT/JP2017/002194, filed on Jan. 24, 2017, which claims priority to Japanese Patent Application No. 2016-017909, filed on Feb. 2, 2016. The contents of these applications are incorporated herein by reference in their entirety.

BACKGROUND

Technical Field

The present disclosure relates to a sealing apparatus, and particularly relates to a sealing apparatus for sealing an annular space formed between two members which are movable relative to each other.

Background Art

Conventionally, a sealing apparatus is used for sealing an annular space formed between two members which are movable relative to each other, for example, an annular space formed between a moving member such as a shaft or a piston and a member such as a housing or a cylinder which covers the moving member on the outer periphery side. FIG. 5 is a partial cross-sectional view showing a schematic configuration of a conventional sealing apparatus of this type. The conventional sealing apparatus 100 shown in FIG. 5 is used in a state in which the sealing apparatus 100 is mounted between an opening 112 of a housing 111 and a shaft 113 so as to seal an annular space formed between the opening 112 of the housing 111 and the shaft 113 inserted into the opening 112 in a manner allowing relative movement. The sealing apparatus 100 includes: a lip member 101 which is made of a resin material such as PTFE (polytetrafluoroethylene) and which has an annular shape about an axis; and a spring member 102 which is made of a metal material and which has an annular shape about the axis. In the lip member 101, an annular outer-periphery-side lip 105 extends toward the high pressure side (the right side in FIG. 5) from an outer periphery side of an end portion of an annular lip base portion 104 on the high pressure side and an annular inner-periphery-side lip 106 extends toward the high pressure side from an inner periphery side of the end portion of the lip base portion 104 on the high pressure side. Accordingly, an annular accommodating groove 103 which is recessed toward the low pressure side (the left side in FIG. 5) in the axis direction is fainted on the lip member 101. As shown in FIG. 6, the spring member 102 is an annular member having a substantially V shape in a cross section, and the spring member 102 is accommodated in the accommodating groove 103. The spring member 102 includes an outer periphery pressing portion 107 extending in an inclined manner from the low pressure side toward the high pressure side and the outer periphery side, and the outer periphery pressing portion 107 comes into contact with the outer-periphery-side lip 105 from the inner periphery side. The spring member 102 includes an inner periphery pressing portion 108 extending in an inclined manner from the low pressure side toward the high pressure side and the inner periphery side, and the inner periphery pressing portion 108 comes into contact with the inner-periphery-side lip 106 from the outer periphery side.

In a usage state of the sealing apparatus 100, the outer-periphery-side lip 105 comes into close contact with the opening 112 of the housing 111, the inner-periphery-side lip 106 comes into close contact with the shaft 113, and the outer-periphery-side lip 105 and the inner-periphery-side lip 106 are pressed in a direction such that the outer-periphery-side lip 105 and the inner-periphery-side lip 106 approach each other by an interference width so that the spring member 102 is compressed. With such a configuration, when the sealing apparatus 100 is in use, the outer-periphery-side lip 105 is pressed against the opening 112 of the housing 111 by a reaction force of the outer periphery pressing portion 107. Further, the inner-periphery-side lip 106 is pressed against the shaft 113 by a reaction force of the inner periphery pressing portion 108. Accordingly, sealing is provided for a space formed between the housing 111 and the shaft 113.

PTFE, which is used as a material for forming the lip member 101, can be used under high temperature and high pressure, and PTFE possesses excellent chemical resistance and oil resistance thus having characteristics suitable for the lip member. However, PTFE plastically deforms easily under high temperature. Accordingly, as described above, the sealing apparatus 100 is equipped with the spring member 102. With such a configuration, even when plastic deformation (settling) occurs in the lip member 101 due to high temperature thus reducing the interference, the spring member 102 presses the lip member 101 and hence, sealing performance of the sealing apparatus 100 is maintained. However, when the sealing apparatus 100 is used at a temperature close to a use limit temperature zone on a high temperature side, due to a difference in coefficient of linear expansion between a metal material for forming the housing 111 and a material for forming the lip member 101, the outer-periphery-side lip 105 is firmly pressed against the housing 111 so that there may be a case in which plastic deformation occurs in the outer-periphery-side lip 105 thus reducing interference of the outer-periphery-side lip 105 with respect to the housing 111. Accordingly, in the sealing apparatus 100, to compensate for the reduction of an interference of the outer-periphery-side lip 105 caused by plastic deformation of the outer-periphery-side lip 105 under high temperature, rigidity of the outer-periphery-side lip 105 is lowered so as to increase the effect (the degree of pressing) of the outer periphery pressing portion 107 of the spring member 102 with respect to the outer-periphery-side lip 105 (For example, see Japanese Patent Application Publication No. 2015-135137).

Recently, there has been demand to reduce fuel consumption of a prime mover such as a vehicle engine or a configuration device of the prime mover such as a driving device for the shaft 113 or the like. In the conventional sealing apparatus 100, an end portion of the spring member 102 on the low pressure side (the left side in FIG. 5) is disposed at a position in which a reaction force of the outer periphery pressing portion 107 and a reaction force of the inner periphery pressing portion 108 are balanced with each other in the accommodating groove 103 and hence, the reaction force of the outer periphery pressing portion 107 cannot be lowered independently from the reaction force of the inner periphery pressing portion 108. Accordingly, as described above, in the conventional sealing apparatus 100, sealing performance can be maintained by reducing an effect of plastic deformation of the outer-periphery-side lip 105. However, when a reaction force of the spring member 102 is reduced so as to reduce friction resistance which is generated between the inner-periphery-side lip 106 and the shaft 113, a contact surface pressure of the outer-periphery-side lip 105 is lowered so that the above-mentioned compensation function with respect to plastic deformation is lowered whereby sealing performance may be declined.

As described above, in the conventional sealing apparatus 100, there has been demand to reduce friction resistance generated in the lip member 101 while suppressing a decline in sealing performance caused by plastic deformation of the lip member 101 when the sealing apparatus 100 is used under high temperature conditions.

The present disclosure is related to providing a sealing apparatus which can reduce friction resistance generated in a lip member can be reduced while preventing a decline in sealing performance.

SUMMARY

A sealing apparatus according to the present disclosure is a sealing apparatus for sealing an annular space formed between two members which are movable relative to each other. The sealing apparatus includes: a lip member which is a member made of a resin material and which has an annular shape about an axis; and a spring member which is a member made of a metal material and which has an annular shape about the axis. The lip member includes: a lip base portion which is a portion having an annular shape about the axis; an outer-periphery-side lip which is an annular lip extending toward one side from an outer periphery side of an end portion of the lip base portion on the one side in a direction of the axis; and an inner-periphery-side lip which is an annular lip extending toward the one side from an inner periphery side of the end portion of the lip base portion on the one side. An accommodating groove which is an annular groove recessed toward an other side from the one side in the direction of the axis is formed in the lip member. The spring member is accommodated in the accommodating groove. The spring member includes: a spring base portion which is a portion having an annular shape about the axis; an outer periphery pressing portion for pressing the outer-periphery-side lip from the inner periphery side; and an inner periphery pressing portion for pressing the inner-periphery-side lip from the outer periphery side. The outer periphery pressing portion is a portion extending such that the portion inclines toward the outer periphery side from an end portion of the spring base portion on the outer periphery side toward the one side. The outer periphery pressing portion includes a plurality of outer periphery pressing pieces which come into contact with the outer-periphery-side lip from the inner periphery side. The inner periphery pressing portion is a portion extending such that the portion inclines toward the inner periphery side from an end portion of the spring base portion on the inner periphery side toward the one side. The inner periphery pressing portion includes a plurality of inner periphery pressing pieces which come into contact with the inner-periphery-side lip from the outer periphery side. The outer periphery pressing piece has a cutout extending along the axis without reaching an edge of the outer periphery pressing piece on the one side. The inner periphery pressing piece has a cutout extending along the axis without reaching an edge of the inner periphery pressing piece on the one side.

In the sealing apparatus according to one aspect of the present disclosure, the outer periphery pressing pieces of the outer periphery pressing portion are arranged at equal angular intervals centered about the axis. The inner periphery pressing pieces of the inner periphery pressing portion are arranged at equal angular intervals centered about the axis.

In the sealing apparatus according to one aspect of the present disclosure, each of the outer periphery pressing pieces and each of the inner periphery pressing pieces are arranged so as not to exact oppositely face each other in a direction orthogonal to the axis.

In the sealing apparatus according to one aspect of the present disclosure, the spring base portion of the spring member has a shape which is curved so as to project toward the other side in a cross section along the axis.

According to a sealing apparatus of the present disclosure, friction resistance generated between a lip member and a portion which comes into contact with the lip member can be reduced while preventing a decline in sealing performance.

DESCRIPTION OF EMBODIMENTS

Hereinafter, an embodiment of the present disclosure will be described in detail with reference to drawings.

Figure 1:
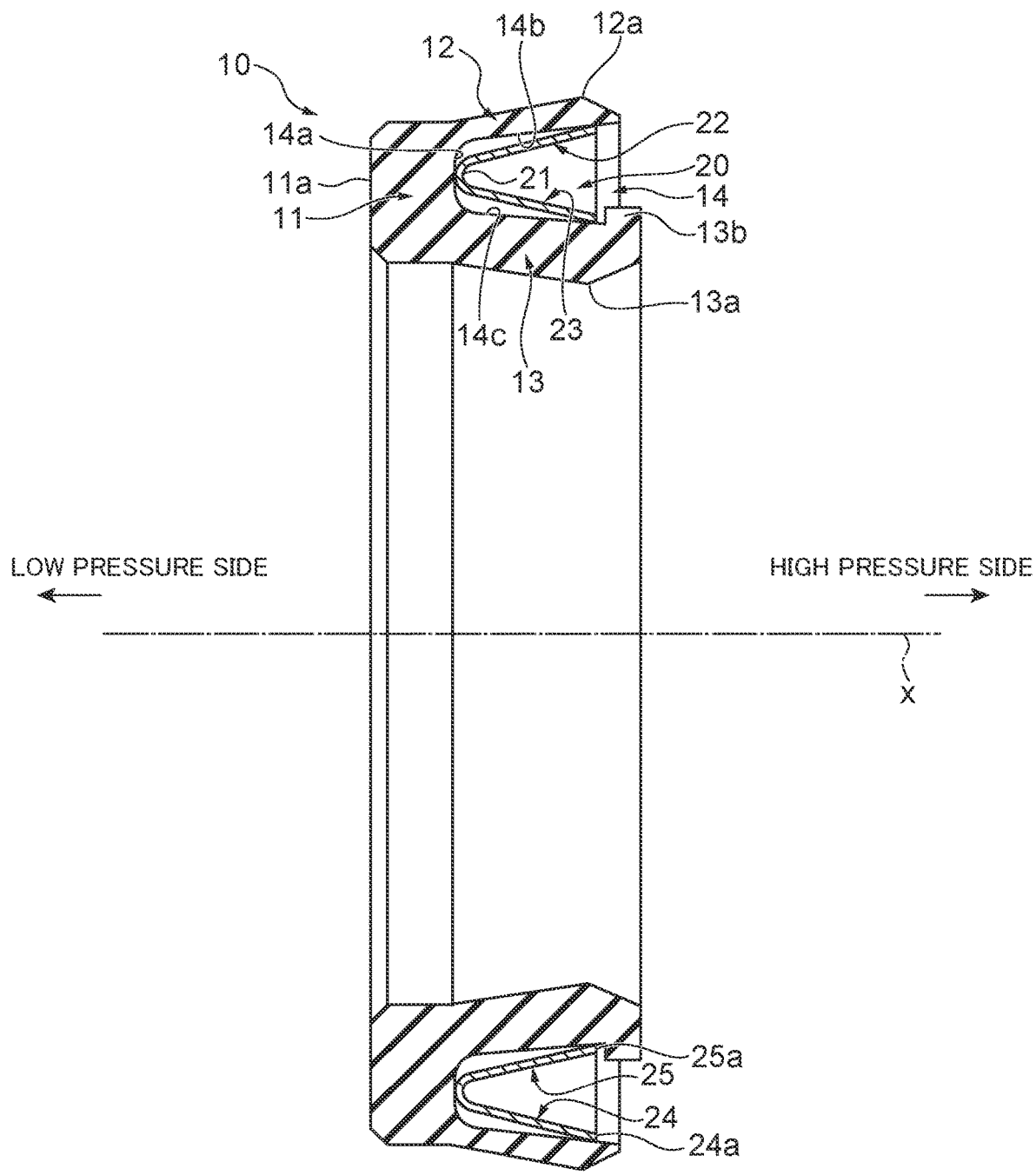
FIG. 1 is a cross-sectional view showing a schematic configuration of a sealing apparatus according to an embodiment of the present disclosure in a cross section as seen along an axis.

FIG. 1 is a cross-sectional view showing a schematic configuration of a sealing apparatus according to the embodiment of the present disclosure in a cross section as seen along an axis. The sealing apparatus 1 according to the embodiment of the present disclosure is mounted in an annular space formed between two members which are movable relative to each other so as to provide sealing of the space. To be specific, the sealing apparatus 1 is used for sealing an annular space formed between a moving member, such as a shaft or a piston, and a member, such as a housing or a cylinder, which covers the moving member on the outer periphery side. As described later, the sealing apparatus 1 according to this embodiment is used for sealing a space formed between a shaft of an EGR valve and a housing as a packing of the EGR valve provided to a vehicle engine.

As shown in FIG. 1, the sealing apparatus 1 includes: a lip member 10 which is a member made of a resin material and which has an annular shape about an axis x; and a spring member 20 which is a member made of a metal material and which has an annular shape about the axis x. As a resin material for forming the lip member 10, for example, PTFE (polytetrafluoroethylene), polyamide or the like may be used. To be more specific, as a resin material for forming the lip member 10, PTFE containing a filler, such as carbon fibers, glass fibers or a bronze powder, may be preferably used. Further, as a metal material for forming the spring member 20, stainless steel is used, for example.

The lip member 10 includes a lip base portion 11, an outer-periphery-side lip 12, and an inner-periphery-side lip 13. The lip member 10 has an accommodating groove 14 which is an annular groove recessed from one side (the right side in FIG. 1) in the direction of the axis x toward other side (the left side in FIG. 1) in the direction of the axis x. As described later, in a usage state of the sealing apparatus 1, the above-mentioned one side becomes the high pressure side where a fluid which is a substance to be sealed is confined, and the above-mentioned other side becomes the low pressure side.

The lip base portion 11 is a portion having an annular shape about the axis x. To be specific, as shown in FIG. 1, the lip base portion 11 has a circular cylindrical shape or a circular annular shape centered or substantially centered about the axis x, and the lip base portion 11 has a rectangular shape or a substantially rectangular shape in a cross section along the axis x (hereinafter, simply referred to as "cross section"). In the lip base portion 11, an end surface 11a which is an end surface on the low pressure side forms a hollow disc plane which expands on a plane orthogonal or substantially orthogonal to the axis x. The lip base portion 11 may have another shape such as another polygonal shape or a circular shape in a cross section.

The outer-periphery-side lip 12 is an annular lip extending toward the high pressure side from the outer periphery side at an end portion of the lip base portion 11 on the high pressure side. The outer-periphery-side lip 12 is formed such that, in a usage state, the outer periphery side of the outer-periphery-side lip 12 comes into close contact with the housing. To be specific, as shown in FIG. 1, the outer-periphery-side lip 12 has a circular annular shape centered or substantially centered about the axis x, and a lip distal end portion 12a, which is a projecting portion projecting toward the outer periphery side, is formed on the outer periphery side of the outer-periphery-side lip 12. In the outer-periphery-side lip 12, a width of the lip distal end portion 12a in the direction orthogonal to the axis x (hereinafter, also referred to as "radial direction") is set larger than a width in the radial direction of a proximal portion connected to the lip base portion 11.

The inner-periphery-side lip 13 is an annular lip extending toward the high pressure side from the inner periphery side at an end portion of the lip base portion 11 on the high pressure side. The inner-periphery-side lip 13 is formed such that, in the usage state, the inner periphery side of the inner-periphery-side lip 13 comes into close contact with the shaft such that the shaft is slidable. To be specific, as shown in FIG. 1, the inner-periphery-side lip 13 has a circular annular shape centered or substantially centered about the axis x, and a lip distal end portion 13a, which is a projecting portion projecting toward the inner periphery side, is formed on the inner periphery side of the inner-periphery-side lip 13. The inner-periphery-side lip 13 also includes a projection portion 13b, and the projection portion 13b is an annular portion projecting in the direction toward an outer periphery from an end portion on the high pressure side of an inner peripheral surface of the inner-periphery-side lip 13. As described later, the projection portion 13b functions as a retaining member for the spring member 20 accommodated in the accommodating groove 14.

In the lip member 10, the lip base portion 11, the outer-periphery-side lip 12, and the inner-periphery-side lip 13 are made of the same material and are formed into an integral body. An end surface of the lip base portion 11 on the high pressure side, a peripheral surface of the outer-periphery-side lip 12 on the inner periphery side, and a peripheral surface of the inner-periphery-side lip 13 on the outer periphery side define the above-mentioned accommodating groove 14. That is, the end surface of the lip base portion 11 on the high pressure side forms a bottom surface 14a which is a bottom surface of the accommodating groove 14. The peripheral surface of the outer-periphery-side lip 12 on the inner periphery side forms an outer peripheral surface 14b which is a peripheral surface of the accommodating groove 14 on the outer periphery side. The peripheral surface of the inner-periphery-side lip 13 on the outer periphery side forms an inner peripheral surface 14c which is a peripheral surface of the accommodating groove 14 on the inner periphery side. Further, as shown in FIG. 1, the proximal portion of the outer-periphery-side lip 12 may have a smaller width in the radial direction than a proximal portion of the inner-periphery-side lip 13. With such a configuration, it is possible to increase the effect of the spring member 20 with respect to the outer-periphery-side lip 12 so that plastic deformation can be compensated for.

The spring member 20 includes: a spring base portion 21 which is a portion having an annular shape about the axis x; an outer periphery pressing portion 22 for pressing the outer-periphery-side lip 12 from the inner periphery side; and an inner periphery pressing portion 23 for pressing the inner-periphery-side lip 13 from the outer periphery side. The spring member 20 is formed such that the spring member 20 can be accommodated in the accommodating groove 14 of the lip member 10, and the spring member 20 is accommodated in the accommodating groove 14 in the sealing apparatus 1.

Figure 2:
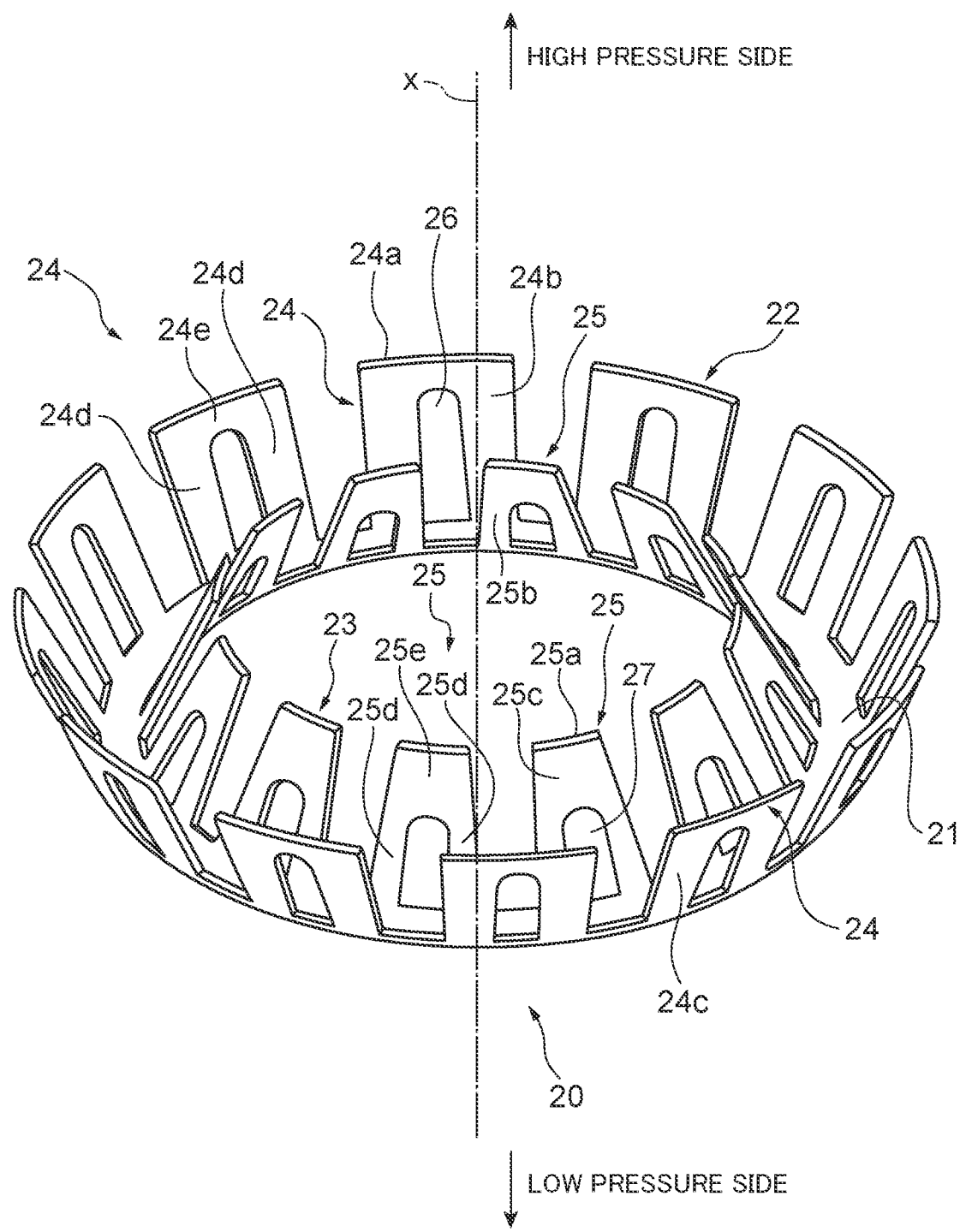
FIG. 2 is a perspective view showing a schematic structure of a spring member of the sealing apparatus shown in FIG. 1.

To be specific, as shown in FIG. 1 and FIG. 2, which is a perspective view of the spring member 20, the spring base portion 21 has an endless circular annular shape centered or substantially centered about the axis x, and the spring base portion 21 has a shape which is curved so as to project toward the low pressure side in a cross section. For example, as shown in FIG. 1, the spring base portion 21 has a substantially U shape or a substantially V shape in a cross section. The outer periphery pressing portion 22 includes a plurality of outer periphery pressing pieces 24, and the inner periphery pressing portion 23 includes a plurality of inner periphery pressing pieces 25. The outer periphery pressing pieces 24 come into contact with the outer-periphery-side lip 12 from the inner periphery side, and the inner periphery pressing pieces 25 come into contact with the inner-periphery-side lip 13 from the outer periphery side.

To be specific, as shown in FIG. 2, each outer periphery pressing piece 24 is a plate piece portion extending such that the plate piece portion inclines toward the outer periphery side from the end portion of the spring base portion 21 on the outer periphery side toward the high pressure side, and the outer periphery pressing piece 24 extends along the axis x. Further, each outer periphery pressing piece 24 is curved so as to project toward the outer periphery side and hence, the outer periphery pressing piece 24 has a profile which is curved along an end portion of the spring base portion 21 on the outer periphery side in a cross section orthogonal to the axis x. To be more specific, each outer periphery pressing piece 24 has a profile extending along an arc of circumference centered about the axis x.

Further, as shown in FIG. 2, each outer periphery pressing piece 24 has a cutout 26 which is a cutout (slot) extending along the axis x without reaching a high-pressure-side edge 24a, which is an edge of the outer periphery pressing piece 24 on the high pressure side. To be specific, the cutout 26 extends along a projection line of the axis x to an inner peripheral surface 24b, which is a surface of the outer periphery pressing piece 24 on the inner periphery side, or to an outer peripheral surface 24c, which is a surface of the outer periphery pressing piece 24 on the outer periphery side. The cutout 26 penetrates the outer periphery pressing piece 24 between the inner peripheral surface 24b and the outer peripheral surface 24c. A portion of the outer periphery pressing piece 24 disposed further on the low pressure side than the high-pressure-side edge 24a is separated into two portions by the cutout 26. However, the high-pressure-side edge 24a and an end portion of the outer periphery pressing piece 24 on the high pressure side in the vicinity of the high-pressure-side edge 24a are not separated, but remain connected. That is, a pair of outer periphery pressing piece leg portions 24d of the outer periphery pressing piece 24 are disposed opposite each other in the circumferential direction with the cutout 26 interposed therebetween, and extend in the extending direction, and the pair of outer periphery pressing piece leg portions 24d are connected to each other by an outer periphery pressing piece connecting portion 24e extending in the circumferential direction on the high pressure side. A width of the cutout 26 in the circumferential direction is set to a desired width. For example, a width of the cutout 26 is set such that each of the two separate portions (outer periphery pressing piece leg portions 24d) has a width with which a force of the outer periphery pressing piece 24 which presses the outer-periphery-side lip 12 of the lip member 10 described later assumes a desired value. Further, the cutout 26 is formed in the outer periphery pressing piece 24 at an intermediate position in the circumferential direction so that two portions separated from each other by the cutout 26 have the same width in the circumferential direction. By taking into account the cutout 26, a width of the outer periphery pressing piece 24 in the circumferential direction is set to a width with which a force of the outer periphery pressing piece 24, which presses the outer-periphery-side lip 12, assumes a desired value. To make a reaction force generated in the outer periphery pressing piece 24 uniform in the circumferential direction when the spring member 20 is compressed in the radial direction, it is preferable for the cutout 26 to extend at an intermediate position of the outer periphery pressing piece 24 in the circumferential direction.

To be specific, as shown in FIG. 2, each inner periphery pressing piece 25 is a plate piece portion extending such that the plate piece portion inclines toward the inner periphery side from the end portion of the spring base portion 21 on the inner periphery side toward the high pressure side, and the inner periphery pressing piece 25 extends along the axis x. Further, each inner periphery pressing piece 25 is curved so as to project toward the outer periphery side and hence, the inner periphery pressing piece 25 has a profile which is curved along an end portion of the spring base portion 21 on the inner periphery side in a cross section orthogonal to the axis x. To be more specific, each inner periphery pressing piece 25 has a profile extending along an arc of circumference centered about the axis x.

Further, as shown in FIG. 2, each inner periphery pressing piece 25 has a cutout 27 which is a cutout (slot) extending along the axis x without reaching a high-pressure-side edge 25a which is an edge of the inner periphery pressing piece 25 on the high pressure side. To be specific, the cutout 27 extends along a projection line of the axis x to an inner peripheral surface 25b, which is a surface of the inner periphery pressing piece 25 on the inner periphery side, or to an outer peripheral surface 25c, which is a surface of the inner periphery pressing piece 25 on the outer periphery side. The cutout 27 penetrates the inner periphery pressing piece 25 between the inner peripheral surface 25b and the outer peripheral surface 25c. A portion of the inner periphery pressing piece 25 disposed further on the low pressure side than the high-pressure-side edge 25a is separated into two portions by the cutout 27. However, the high-pressure-side edge 25a and an end portion of the inner periphery pressing piece 25 on the high pressure side in the vicinity of the high-pressure-side edge 25a are not separated, but remain connected. That is, a pair of inner periphery pressing piece leg portions 25d of the inner periphery pressing piece 25 are disposed opposite each other in the circumferential direction with the cutout 27 interposed therebetween, and extend in the extending direction, and the pair of inner periphery pressing piece leg portions 25d are connected to each other by an inner periphery pressing piece connecting portion 25e extending in the circumferential direction on the high pressure side. A width of the cutout 27 in the circumferential direction is set to a desired width. For example, a width of the cutout 27 is set such that each of the two separate portions (inner periphery pressing piece leg portions 25d) has a width with which a force of the inner periphery pressing piece 25 which presses the inner-periphery-side lip 13 of the lip member 10 described later assumes a desired value. Further, the cutout 27 is formed in the inner periphery pressing piece 25 at an intermediate position in the circumferential direction so that two portions separated from each other by the cutout 27 have the same width in the circumferential direction. By taking into account the cutout 27, a width of the inner periphery pressing piece 25 in the circumferential direction is set to a width at which a force of the inner periphery pressing piece 25 which presses the inner-periphery-side lip 13 assumes a desired value. To make a reaction force generated in the inner periphery pressing piece 25 uniform in the circumferential direction when the spring member 20 is compressed in the radial direction, it is preferable for the cutout 27 to extend at an intermediate position of the inner periphery pressing piece 25 in the circumferential direction.

In the outer periphery pressing portion 22, the outer periphery pressing pieces 24 are preferably arranged at equal angular intervals centered about the axis x. The number of outer periphery pressing pieces 24 or a distance between the outer periphery pressing pieces 24 disposed adjacently to each other is set to the number or a distance so that a distribution of a force (surface pressure) on pressing the outer-periphery-side lip 12 can assume a desired value.

In the same manner, in the inner periphery pressing portion 23, the inner periphery pressing pieces 25 are preferably arranged at equal angular intervals centered about the axis x. The number of inner periphery pressing pieces 25 or a distance between the inner periphery pressing pieces 25 disposed adjacently to each other is set to the number or a distance so that a distribution of a force (surface pressure) on pressing the inner-periphery-side lip 13 can assume a desired value.

Further, in the spring member 20, any positional relationship may be adopted as a relative positional relationship between the outer periphery pressing pieces 24 and the inner periphery pressing pieces 25. That is, the outer periphery pressing pieces 24 and the inner periphery pressing pieces 25 may be arranged such that each outer periphery pressing piece 24 oppositely faces each inner periphery pressing piece 25 in the radial direction with the spring base portion 21 interposed therebetween. Alternatively, the outer periphery pressing pieces 24 and the inner periphery pressing pieces 25 may be arranged such that each outer periphery pressing piece 24 partially and oppositely faces each inner periphery pressing piece 25 in the radial direction with the spring base portion 21 interposed therebetween. Further, the outer periphery pressing pieces 24 and the inner periphery pressing pieces 25 may be arranged such that each outer periphery pressing piece 24 does not opposedly face each inner periphery pressing piece 25 in the radial direction with the spring base portion 21 interposed therebetween.

Of the relative positional relationships between the outer periphery pressing pieces 24 and the inner periphery pressing pieces 25, it is preferable to adopt the relationship shown in FIG. 2 where the outer periphery pressing pieces 24 and the inner periphery pressing pieces 25 are arranged such that each outer periphery pressing piece 24 and each inner periphery pressing piece 25 do not opposedly face each other in the radial direction. A state in which each outer periphery pressing piece 24 and each inner periphery pressing piece 25 opposedly face each other means a state in which the outer periphery pressing piece 24 and the inner periphery pressing piece 25 opposedly face each other with the spring base portion 21 interposed therebetween such that a width center line of the outer periphery pressing piece 24 in the circumferential direction about the axis x and a width center line of the inner periphery pressing piece 25 in the circumferential direction about the axis x overlap each other in the radial direction. The reason such a relative positional relationship, in which each outer periphery pressing piece 24 and each inner periphery pressing piece 25 do not opposedly face each other, is preferable is as follows. That is, as described later, when the spring member 20 is compressed in the radial direction, a reaction force generated in the outer periphery pressing piece 24 and a reaction force generated in the inner periphery pressing piece 25 can be made more independent from each other.

A length of the outer periphery pressing piece 24 in the extending direction, which is a length of the outer periphery pressing piece 24 in the direction of the projection line of the axis x from a base of the outer periphery pressing piece 24 with the spring portion 21 to the high-pressure-side edge 24a, may be identical to or different from a length of the inner periphery pressing piece 25 in the extending direction, which is a length of the inner periphery pressing piece 25 in the direction of the projection line of the axis x from a base of the inner periphery pressing piece 25 with the spring portion 21 to the high-pressure-side edge 25a.

As shown in FIG. 1, in the sealing apparatus 1, the spring member 20 is accommodated in the accommodating groove 14 of the lip member 10. The spring base portion 21 is seated on (comes into contact with) the bottom surface 14a of the accommodating groove 14. Each outer periphery pressing piece 24 comes into contact with the outer peripheral surface 14b of the accommodating groove 14 at the high-pressure-side edge 24a of the outer periphery pressing piece 24 and a portion in the vicinity of the high-pressure-side edge 24a. Each inner periphery pressing piece 25 comes into contact with the inner peripheral surface 14c of the accommodating groove 14 at the high-pressure-side edge 25a of the inner periphery pressing piece 25 and a portion in the vicinity of the high-pressure-side edge 25a.

In the sealing apparatus 1, it is preferable that a length, an inclination angle or the like of each outer periphery pressing piece 24 of the spring member 20 be set such that the outer periphery pressing piece 24 comes into contact with the outer peripheral surface 14b of the accommodating groove 14 at the position facing away from the lip distal end portion 12a of the outer-periphery-side lip 12 or in the vicinity of such a position. In the same manner, it is preferable that a length or an inclination angle of each inner periphery pressing piece 25 of the spring member 20 be set such that the inner periphery pressing piece 25 comes into contact with the inner peripheral surface 14c of the accommodating groove 14 at the position facing away from the lip distal end portion 13a of the inner-periphery-side lip 13 or in the vicinity of such a position. Further, as described later, lengths in the extending direction of the outer periphery pressing piece 24 and the inner periphery pressing piece 25, and inclination angles of the outer periphery pressing piece 24 and the inner periphery pressing piece 25 with respect to the spring base portion 21 or to the axis x are respectively set such that a desired reaction force is generated in a usage state. In this embodiment, an inclination angle of the outer periphery pressing piece 24 is an angle at which the extending direction of the outer periphery pressing piece 24 (a projection line of the axis x to the outer periphery pressing piece 24) is inclined with respect to the spring base portion 21 or the axis x. An inclination angle of the inner periphery pressing piece 25 is an angle at which the extending direction of the inner periphery pressing piece 25 (a projection line of the axis x to the inner periphery pressing piece 25) is inclined with respect to the spring base portion 21 or the axis x.

As described above, in the lip member 10, the projection portion 13b is formed at an end portion of the inner-periphery-side lip 13 on the high pressure side. In the sealing apparatus 1, as shown in FIG. 1, the projection portion 13b is positioned further on the high pressure side than the high-pressure-side edge 25a of the inner periphery pressing piece 25 of the spring member 20. Accordingly, when the spring member 20 moves to the high pressure side in the accommodating groove 14, a high pressure-side edge 25a of the inner periphery pressing piece 25 impinges on the projection portion 13b of the inner-periphery-side lip 13 so that further movement of the spring member 20 toward the high pressure side is not allowed. As described above, the projection portion 13b of the inner-periphery-side lip 13 functions as a stopper for the spring member 20 in the direction toward the high pressure side.

Figure 3:
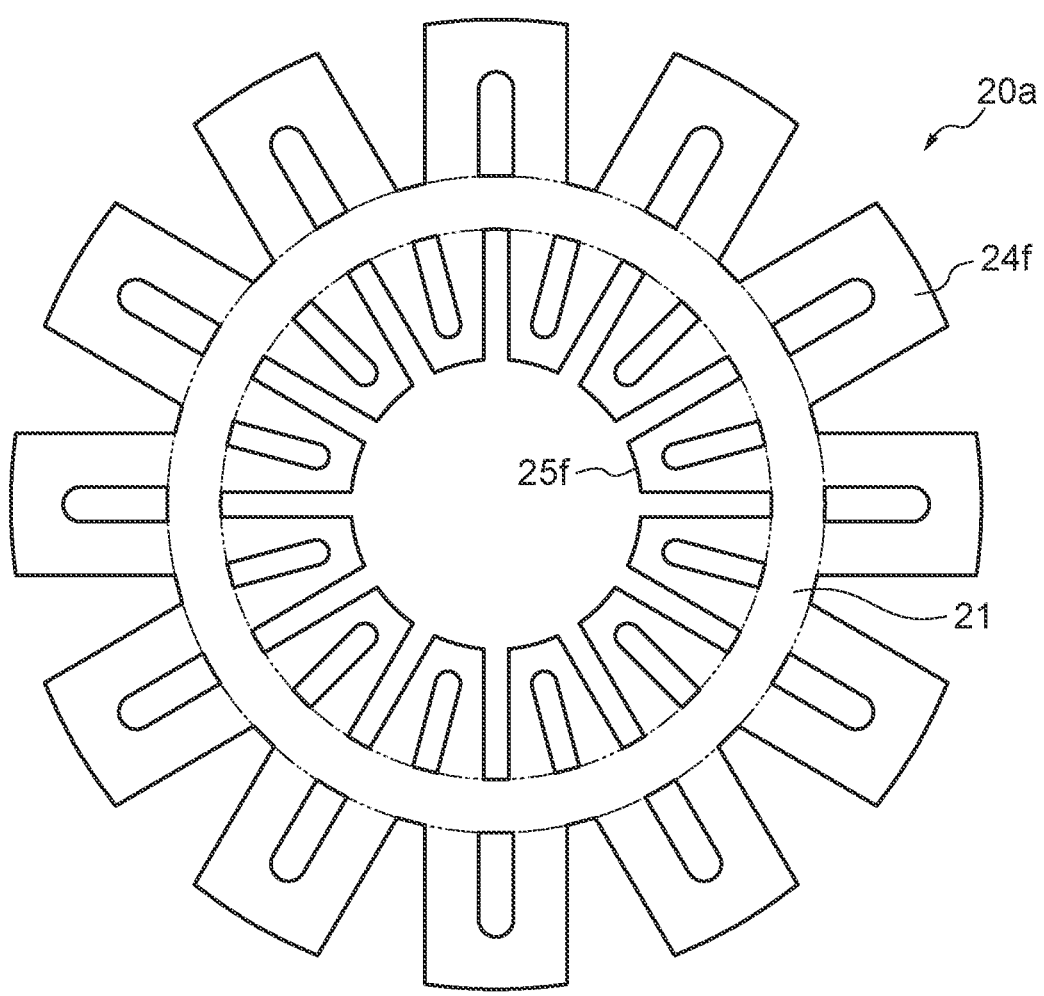
FIG. 3 is a plan view showing a state of the spring member shown in FIG. 2 before the spring member is bent.

Next, one example of a method for manufacturing the spring member 20 is described. The spring member 20 is manufactured from a flat plate having a desired plate thickness and is made of metal. FIG. 3 is a plan view showing a state of the spring member 20 shown in FIG. 2 before the spring member 20 is bent. By cutting or punching a flat plate made of metal, an intermediate product 20a of the spring member 20 in a planar state, that is, in a state before the intermediate product 20a is bent as shown in FIG. 3, is prepared. Then, portions 24f which correspond to the outer periphery pressing pieces 24 and portions 25f which correspond to the inner periphery pressing pieces 25 are bent in the same direction (on the same plane side) such that the portions 24f and the portions 25f are respectively inclined at predetermined angles with respect to the spring base portion 21 or the axis x. As a result, the spring member 20 shown in FIG. 2 is formed. The outer periphery pressing pieces 24 and the inner periphery pressing pieces 25, which extend in an inclined manner at respective predetermined angles with respect to the spring base portion 21 or the axis x, may be formed by bending a portion of the intermediate product 20a which corresponds to the spring base portion 21 in a curved shape. In performing the bending, the portions 24f which correspond to the outer periphery pressing pieces 24 are bent in the circumferential direction such that the respective outer periphery pressing pieces 24 of the outer periphery pressing portion 22 fall within a conical surface centered or substantially centered about the axis x. In the same manner, in performing the bending, the portions 25f which correspond to the inner periphery pressing pieces 25 are bent in the circumferential direction such that the respective inner periphery pressing pieces 25 of the inner periphery pressing portion 23 fall within a conical surface centered or substantially centered about the axis x. The lip member 10 is manufactured by cutting a molded product formed by injection molding or the like.

Figure 4:
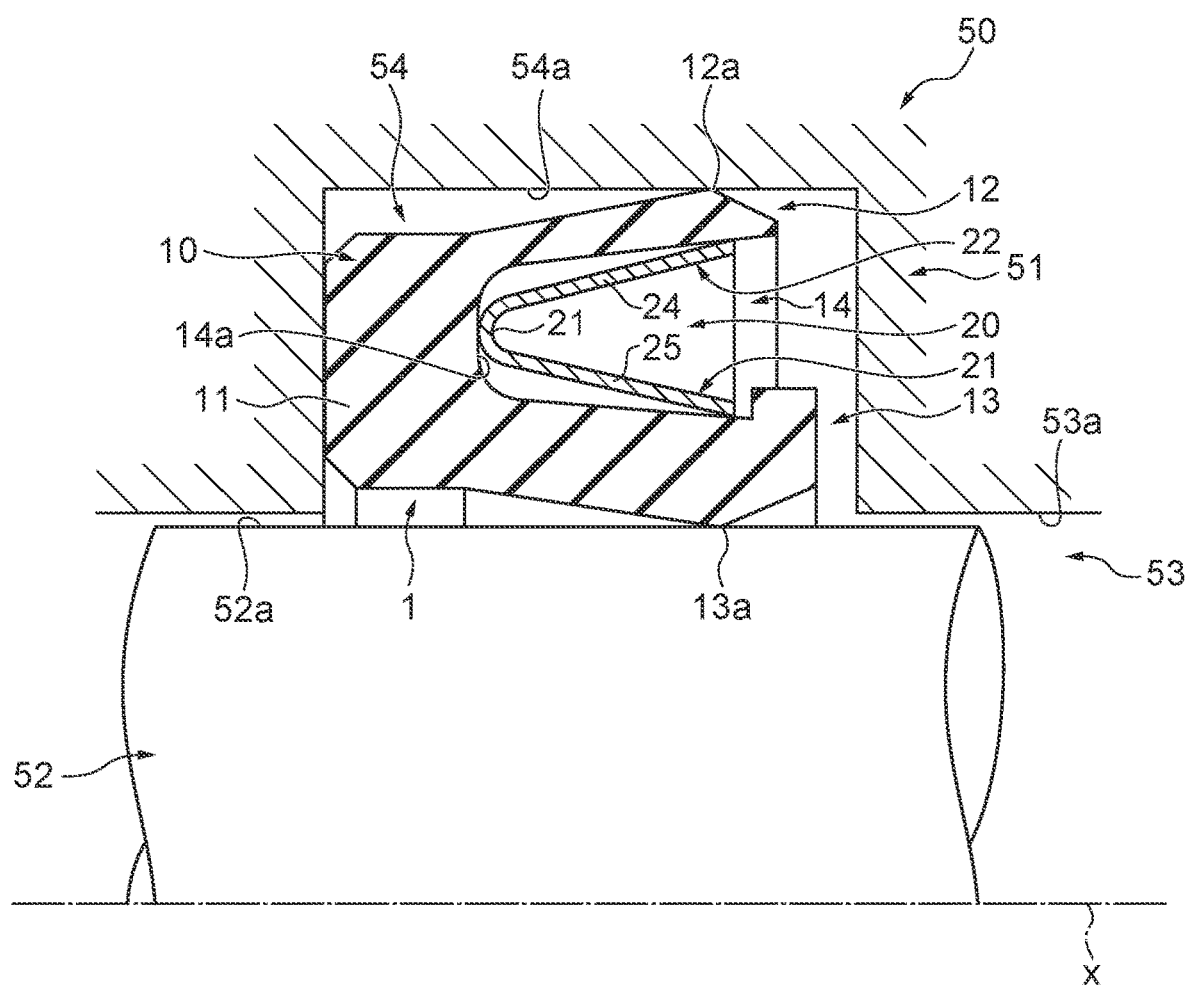
FIG. 4 is a partially enlarged cross-sectional view showing the sealing apparatus shown in FIG. 1 in a usage state as seen along an axis.

Next, the manner of operation of the sealing apparatus 1 having the above-mentioned configuration is described. FIG. 4 is a partial cross-sectional view showing the sealing apparatus 1 in a usage state along the axis x.

As described above, the sealing apparatus 1 is used for sealing a space formed between a shaft of an EGR valve and a housing. In a usage state, as shown in FIG. 4, the sealing apparatus 1 is mounted between a housing 51 of an EGR device 50 and a shaft 52 connected to the EGR valve not shown in the drawing. In the EGR device 50, an opening 53 extending in the direction of the axis x is formed in the housing 51, and the shaft 52 is inserted into the opening 53 so that the housing 51 and the shaft 52 are movable relative to each other. In the EGR device 50, the shaft 52 can perform a reciprocating motion in the direction of the axis x so that the shaft 52 is movable relative to the housing 51. The opening 53 of the housing 51 has an annular groove 54 which is recessed in the radial direction at a portion of an outer peripheral surface 53a of the opening 53. The sealing apparatus 1 is mounted in a state of being accommodated in the groove 54.

In a usage state of the sealing apparatus 1, the outer-periphery-side lip 12 comes into contact with a bottom surface 54a which is a surface of the groove 54 on the outer periphery side. The inner-periphery-side lip 13 comes into contact with an outer peripheral surface 52a of the shaft 52. The outer-periphery-side lip 12 and the inner-periphery-side lip 13 are pressed in the direction so that the outer-periphery-side lip 12 and the inner-periphery-side lip 13 approach each other in the radial direction. The outer-periphery-side lip 12 and the inner-periphery-side lip 13 are respectively pressed corresponding to interferences with respect to the bottom surface 54a of the groove 54 and the outer peripheral surface 52a of the shaft 52, which are set to desired values. The lip distal end portion 12a of the outer-periphery-side lip 12 comes into close contact with the bottom surface 54a of the groove 54. The lip distal end portion 13a of the inner-periphery-side lip 13 comes into close contact with the outer peripheral surface 52a of the shaft 52 such that the shaft 52 is slidable.

In a usage state of the sealing apparatus 1, as described above, the outer-periphery-side lip 12 and the inner-periphery-side lip 13 are pressed in the direction so that the outer-periphery-side lip 12 and the inner-periphery-side lip 13 approach each other and hence, the outer periphery pressing portion 22 (outer periphery pressing pieces 24) and the inner periphery pressing portion 23 (inner periphery pressing pieces 25) of the spring member 20 are pressed in the direction so that the outer periphery pressing portion 22 and the inner periphery pressing portion 23 approach each other. By a reaction force of the outer periphery pressing portion 22 with respect to the pressing toward the inner periphery side, in the sealing apparatus 1, the outer-periphery-side lip 12 is pressed toward the outer periphery side in the radial direction thus being pressed against the bottom surface 54a of the groove 54. Further, by a reaction force of the inner periphery pressing portion 23 with respect to the pressing toward the outer periphery side, in the sealing apparatus 1, the inner-periphery-side lip 13 is pressed toward the inner periphery side in the radial direction thus being pressed against the outer peripheral surface 52a of the shaft 52. In such a manner, sealing is provided to the annular space formed between the opening 53 of the housing 51 and the shaft 52.

In a usage state of the sealing apparatus 1, it is necessary to cause the outer periphery pressing portion 22 (outer periphery pressing pieces 24) of the spring member 20 to generate a reaction force of a magnitude that takes into consideration, for example the following: in addition to the proper sealing performed by the outer-periphery-side lip 12; suppression of the plastic deformation of the outer-periphery-side lip 12 caused by being pressed to the groove 54; and following performance to the shaft 52 for close contact with the shaft 52 even when the shaft 52 is eccentric. On the other hand, in a usage state of the sealing apparatus 1, it is necessary to cause the inner periphery pressing portion 23 (inner periphery pressing pieces 25) of the spring member 20 to generate a reaction force of a magnitude that takes into consideration, for example the following: in addition to the proper sealing performed by the inner-periphery-side lip 13; reduction of sliding resistance (friction resistance) generated between the shaft 52 and the inner-periphery-side lip 13. As described above, a reaction force which the outer periphery pressing portion 22 is required to generate and a reaction force which the inner periphery pressing portion 23 is required to generate differ from each other. Accordingly, in a usage state of the sealing apparatus 1, it is desirable for the sealing apparatus that reaction forces having different magnitudes can be respectively generated in the outer periphery pressing portion 22 and the inner periphery pressing portion 23.

Figure 5:
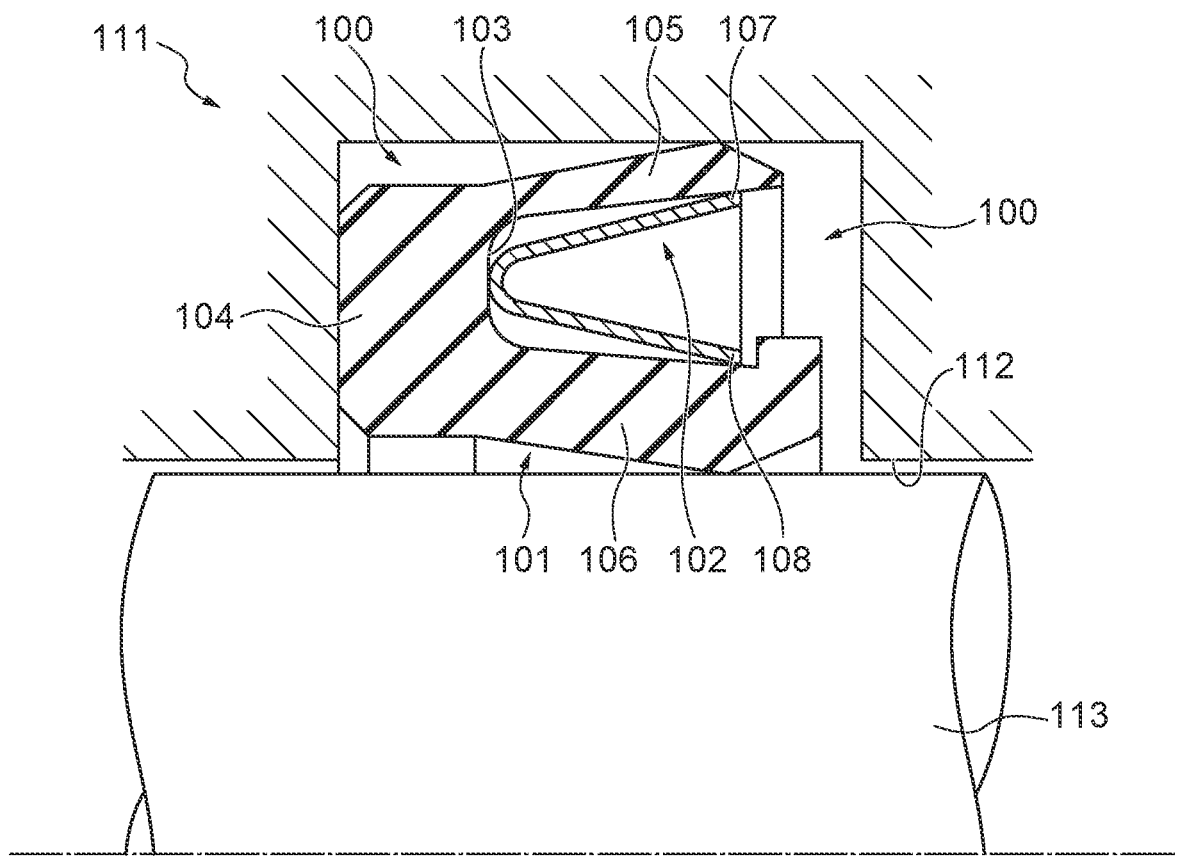
FIG. 5 is a partial cross-sectional view showing a schematic configuration of a conventional sealing apparatus.
Figure 6:
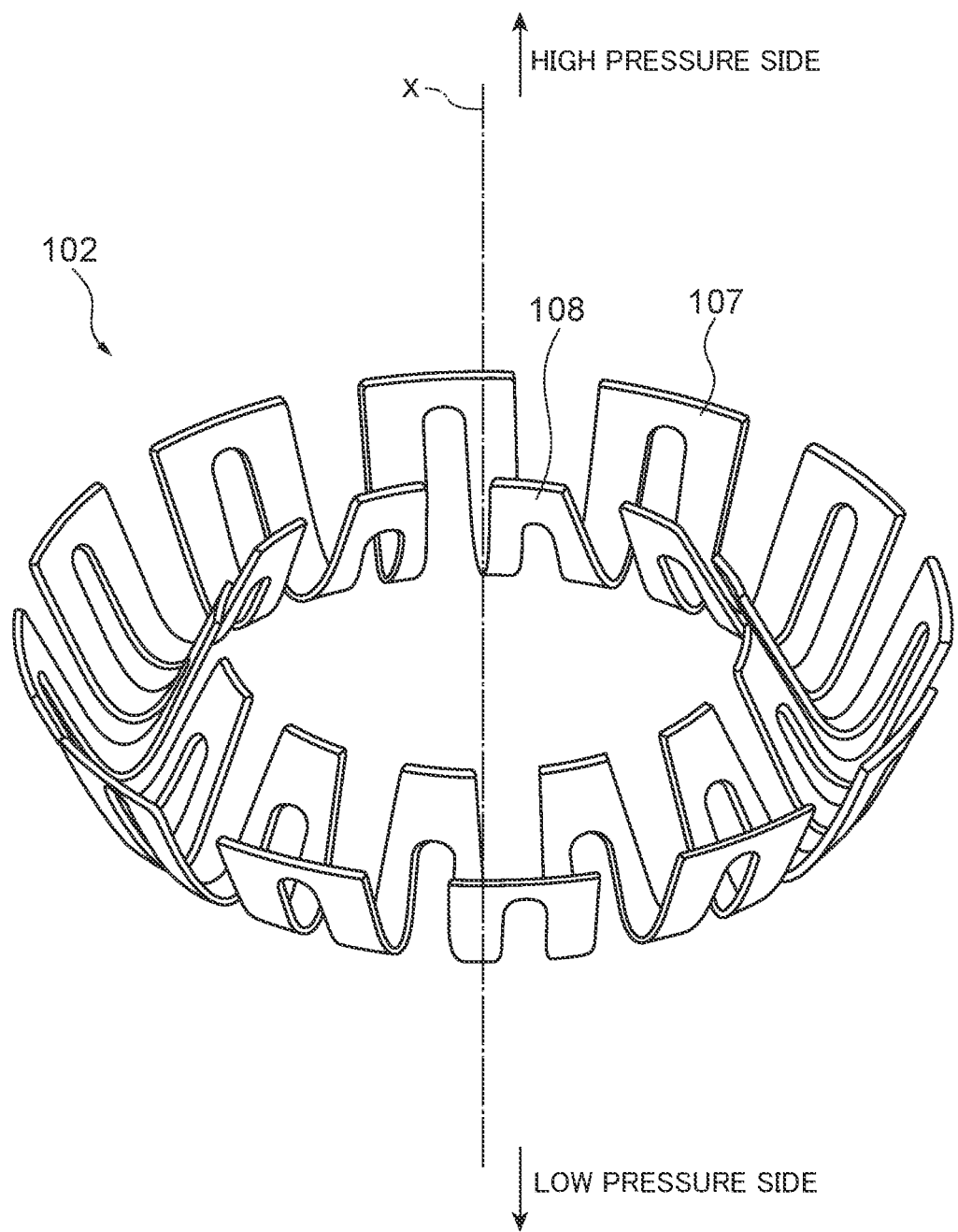
FIG. 6 is a perspective view showing a schematic shape of a spring member which the conventional sealing apparatus includes.

With respect to such issues, however, in the conventional sealing apparatus 100 or the like shown in FIGS. 5, 6, the outer periphery pressing portion 107 and the inner periphery pressing portion 108 of the spring member 102 are directly connected to each other at end portions on the low pressure side. Accordingly, until a reaction force of the outer periphery pressing portion 107 of the spring member 102 and a reaction force of the inner periphery pressing portion 108 of the spring member 102 are balanced, an end portion of the spring member 102 on the low pressure side moves in the accommodating groove 103.

On the other hand, in the sealing apparatus 1 according to the embodiment of the present disclosure, the annular spring base portion 21 is formed on the spring member 20, and the outer periphery pressing pieces 24 and the inner periphery pressing pieces 25 of the spring member 20 are not directly connected to each other at end portions on the low pressure side and hence, rigidity of a portion of the spring member 20 which connects the outer periphery pressing portion 22 and the inner periphery pressing portion 23 to each other on the low pressure side is increased. Accordingly, in a usage state of the sealing apparatus 1, it is possible to suppress a reaction force generated in the outer periphery pressing portion 22 and a reaction force generated in the inner periphery pressing portion 23 influencing each other, and the reaction force generated in the outer periphery pressing portion 22 and the reaction force generated in the inner periphery pressing portion 23 can be made independent from each other. As described above, in the sealing apparatus 1, the outer periphery pressing portion 22 can be formed such that a reaction force generated in the outer periphery pressing portion 22 in a usage state assumes a desired reaction force different from a reaction force generated in the inner periphery pressing portion 23. Further, the inner periphery pressing portion 23 can be formed such that a reaction force generated in the inner periphery pressing portion 23 in a usage state assumes a desired reaction force different from a reaction force generated in the outer periphery pressing portion 22.

As a method for setting reaction forces generated in the outer periphery pressing portion 22 and the inner periphery pressing portion 23, values of a magnitude of an inclination angle of each of the outer periphery pressing piece 24 and the inner periphery pressing piece 25 with respect to the spring base portion 21 or the axis x, lengths of the outer periphery pressing piece 24 and the inner periphery pressing piece 25 in the extending direction, a thickness of the spring member 20 (a thickness of a plate material which is a material for forming the spring member 20) or the like may be selectively determined.

To make a reaction force generated in the outer periphery pressing portion 22 and a reaction force generated in the inner periphery pressing portion 23 independent from each other, in the sealing apparatus 1, it is preferable to allow the spring base portion 21 to come into contact with the bottom surface 14a of the accommodating groove 14. Accordingly, for example, the inner-periphery-side lip 13 may be formed such that the projection portion 13b of the inner-periphery-side lip 13 abuts on the high-pressure-side edge 25a of the inner periphery pressing piece 25 in a state in which the spring base portion 21 comes into contact with the bottom surface 14a of the accommodating groove 14.

In the sealing apparatus 1, to reduce sliding resistance between the inner-periphery-side lip 13 and the shaft 52, a shape of each inner periphery pressing piece 25 of the inner periphery pressing portion 23 is set such that a reaction force which can become a pressing force necessary for sealing performed by the inner-periphery-side lip 13 is generated in the inner periphery pressing portion 23. On the other hand, to enhance following performance or the like of the inner-periphery-side lip 13 to the shaft 52 so as to enhance sealing performance of the sealing apparatus 1, a shape of each outer periphery pressing piece 24 of the outer periphery pressing portion 22 is set such that a reaction force larger than a reaction force of the inner periphery pressing portion 23 is generated in the outer periphery pressing portion 22.

Further, in the sealing apparatus 1, as shown in FIG. 2, the cutout 26, extending along the axis x without reaching the high-pressure-side edge 24a is formed in each outer periphery pressing piece 24 so that a width of the outer-periphery-side lip 12 in the circumferential direction can be increased and, at the same time, a width in the circumferential direction of the high-pressure-side edge 24a, which comes into contact with the outer-periphery-side lip 12 can be increased. Accordingly, on a line in the circumferential direction which connects portions at which the respective outer periphery pressing pieces 24 come into contact with the outer-periphery-side lip 12, it is possible to reduce the proportion of portions of the outer periphery pressing pieces 24 which do not come into contact with the outer-periphery-side lip 12 and hence, in a usage state, it is possible to make a surface pressure at a contact portion between the outer-periphery-side lip 12 and the groove 54 more uniform. Therefore, it is possible to suppress leakage of a substance to be sealed from a portion at which the outer periphery pressing piece 24 does not come into contact with the outer-periphery-side lip 12 and hence, sealing performance of the outer-periphery-side lip 12 can be enhanced. Further, with the formation of the cutout 26, the outer periphery pressing piece 24, which is smoothly curved, can be easily formed from the intermediate product 20a, and it is possible to prevent the formation of a portion at which stress is generated in a concentrated manner in the outer periphery pressing piece 24 and hence, durability of the spring member 20 can be enhanced.

In the same manner, in the sealing apparatus 1, as shown in FIG. 2, the cutout 27 extending along the axis x without reaching the high-pressure-side edge 25a is formed in each inner periphery pressing piece 25 so that a width of the inner-periphery-side lip 13 in the circumferential direction can be increased and, at the same time, a width in the circumferential direction of the high-pressure-side edge 25a, which comes into contact with the inner-periphery-side lip 13 can be increased. Accordingly, on a line in the circumferential direction which connects portions at which the respective inner periphery pressing pieces 25 come into contact with the inner-periphery-side lip 13, it is possible to reduce the proportion of portions of the inner periphery pressing piece 25 which do not come into contact with the inner-periphery-side lip 13 and hence, in a usage state, it is possible to make a surface pressure at a contact portion between the inner-periphery-side lip 13 and the shaft 52 more uniform. Therefore, it is possible to suppress leakage of a substance to be sealed from a portion at which the inner periphery pressing piece 25 does not come into contact with the inner-periphery-side lip 13 and hence, sealing performance of the inner-periphery-side lip 13 can be enhanced. Further, with the formation of the cutout 27, the inner periphery pressing piece 25, which is smoothly curved, can be easily formed from the intermediate product 20a, and it is possible to prevent the formation of a portion at which stress is generated in a concentrated manner in the inner periphery pressing piece 25 and hence, durability of the spring member 20 can be enhanced.

As described above, with the formation of the cutout 26, while a width of the outer periphery pressing piece 24 in the circumferential direction is increased, a width in the circumferential direction of the high-pressure-side edge 24a of the outer periphery pressing piece 24 is increased. Further, with the formation of the cutout 27, while a width of the inner periphery pressing piece 25 in the circumferential direction is increased, a width in the circumferential direction of the high-pressure-side edge 25a of the inner periphery pressing piece 25 is increased. Accordingly, sealing performance of the sealing apparatus 1 can be enhanced. Durability of the spring member 20 can also be enhanced.

As described above, in the sealing apparatus 1, it is possible to cause, in a usage state, the outer periphery pressing portion 22 and the inner periphery pressing portion 23 to respectively generate different reaction forces which are independent from each other. Further, while a decline in sealing performance of the sealing apparatus 1 can be prevented, sliding resistance of the sealing apparatus 1 can be reduced, and following performance of the sealing apparatus 1 to the shaft 52 can be enhanced.

As described above, according to the sealing apparatus 1 of the embodiment of the present disclosure, while a decline in sealing performance can be prevented, friction resistance generated between the lip member 10 and a portion which comes into contact with the lip member 10 can be reduced.

Although the embodiment of the present disclosure has been described above, the present disclosure is not limited to the above-mentioned sealing apparatus 1 according to the embodiment of the present disclosure, and includes any mode which fails within the concept and Claims of the present disclosure. Further, respective configurations may be selectively combined as desired such that the above-mentioned problem and advantageous effects can be at least partially acquired. For example, a shape, a material, an arrangement, a size or the like of respective constitutional elements in the above-mentioned embodiment is changeable as desired according to a specific use mode of the present disclosure.

Further, an object in which the sealing apparatus according to the present disclosure is to be used is not limited to the above-mentioned EGR device 50. For example, as a sealing apparatus for exhaust gas or for high temperature use, the sealing apparatus according to the present disclosure may be used in another apparatus to which the manner of operation of the present disclosure is applicable. Further, an object in which the sealing apparatus according to the present disclosure is to be used is not limited to a member which reciprocates along the axis x like the above-mentioned shaft 52, and may also be used for a member which rotates or swings with respect to the axis x.

What is claimed is:

1. A sealing apparatus for sealing an annular space formed between two members which are movable relative to each other, the sealing apparatus comprising:
    a lip member which is a member made of a resin material and which has an annular shape about an axis; and
    a spring member which is a member made of a metal material and which has an annular shape about the axis, wherein
    the lip member includes: a lip base portion which is a portion having an annular shape about the axis, an outer-periphery-side lip which is an annular lip extending toward one side from an outer periphery side of an end portion of the lip base portion on the one side in a direction of the axis, an inner-periphery-side lip which is an annular lip extending toward the one side from an inner periphery side of the end portion of the lip base portion on the one side, and an accommodating groove which is an annular groove recessed toward an other side from the one side in the direction of the axis,
    the spring member is accommodated in the accommodating groove, and the spring member includes: a spring base portion which is a portion having an endless annular shape about the axis; an outer periphery pressing portion for pressing the outer-periphery-side lip from the inner periphery side; and an inner periphery pressing portion for pressing the inner-periphery-side lip from the outer periphery side,
    the outer periphery side toward the one side, and the outer periphery pressing portion includes a plurality of outer periphery pressing pieces which come into contact with the outer-periphery-side lip from the inner periphery side,
    the inner periphery pressing portion includes a plurality of inner periphery pressing pieces which come into contact with the inner-periphery-side lip from the outer periphery side,
    each of the outer periphery pressing pieces extends such that the outer periphery pressing piece inclines toward the outer periphery side from an end portion of the spring base portion on the outer periphery side toward the one side, and each of the outer periphery pressing pieces has a cutout extending along the axis without reaching an edge of the outer periphery pressing piece on the one side, and
    each of the inner periphery pressing pieces extends such that the inner periphery pressing piece inclines toward the inner periphery side from an end portion of the spring base portion on the inner periphery side toward the one side, and each of the inner periphery pressing pieces has a cutout extending along the axis without reaching an edge of the inner periphery pressing piece on the one side.

2. The sealing apparatus according to claim 1, wherein the outer periphery pressing pieces of the outer periphery pressing portion are arranged at equal angular intervals centered about the axis, and the inner periphery pressing pieces of the inner periphery pressing portion are arranged at equal angular intervals centered about the axis.

3. The sealing apparatus according to claim 1, wherein each of the outer periphery pressing pieces and each of the inner periphery pressing pieces are arranged so as not to exact oppositely face each other in a direction orthogonal to the axis.

4. The sealing apparatus according to claim 1, wherein the spring base portion of the spring member has a shape which is curved so as to project toward the other side in a cross section along the axis.

5. The sealing apparatus according to claim 1, wherein the cutout of each of the outer periphery pressing pieces and the cutout of each of the inner periphery pressing pieces do not connect with each other.

6. The sealing apparatus according to claim 1, wherein the cutouts of each of the outer periphery pressing pieces and the inner periphery pressing pieces do not reach an apex of the base portion opposite an opening of the accommodating groove at the one side.

7. The sealing apparatus according to claim 1, wherein the outer periphery pressing pieces are circumferentially separated from one another, and wherein the inner periphery pressing pieces are circumferentially separated from one another.

8. The sealing apparatus according to claim 7, wherein longitudinally extending gaps, extending along the axis, provide the circumferential separation between the outer periphery pressing pieces and the inner periphery pressing pieces, respectively.

9. The sealing apparatus according to claim 8, wherein the longitudinally extending gaps between the outer periphery pressing pieces are arranged so as not to exact oppositely face the longitudinally extending gaps between the inner periphery extending pieces in a direction orthogonal to the axis.

10. The sealing apparatus according to claim 8, wherein the longitudinally extending gaps open in a direction of the one side and reach an edge of the respective inner or outer periphery pressing portion at the one side.

11. The sealing apparatus according to claim 8, wherein the cutouts at each of the respective inner and outer periphery pressing portions have the longitudinally extending gaps disposed circumferentially therebetween in an alternating arrangement.

12. The sealing apparatus according to claim 8, wherein the cutouts do not connect with the longitudinally extending gaps at each of the respective inner and outer periphery pressing portions.

13. The sealing apparatus according to claim 8, wherein at each of the respective inner and outer periphery pressing portions, the longitudinally extending gaps have a different shape than the respective cutouts.

* * * * *